US007152525B2

(12) United States Patent
Armstrong

(10) Patent No.: US 7,152,525 B2
(45) Date of Patent: Dec. 26, 2006

(54) PRODUCT BRANDING APPARATUS AND METHODS FOR MAKING AND USING SAME

(75) Inventor: Donald M. Armstrong, 858 Union Pacific St., Fillmore, CA (US) 93015

(73) Assignee: Donald M. Armstrong, Fillmore, CA (US)

( * ) Notice: Subject to any disclaimer, the term of this patent is extended or adjusted under 35 U.S.C. 154(b) by 114 days.

(21) Appl. No.: 10/941,379

(22) Filed: Sep. 15, 2004

(65) Prior Publication Data

US 2006/0054034 A1 Mar. 16, 2006

(51) Int. Cl.
*A47J 37/08* (2006.01)

(52) U.S. Cl. ............................ 101/35; 99/388; 99/430

(58) Field of Classification Search .................. 99/386, 99/430, 388; 101/35, 494
See application file for complete search history.

(56) References Cited

U.S. PATENT DOCUMENTS

| | | | | | |
|---|---|---|---|---|---|
| 60,439 | A | * | 12/1866 | Todd | 101/31 |
| 475,884 | A | * | 5/1892 | Murrey | 99/388 |
| 2,246,719 | A | | 6/1941 | Burnham | |
| 2,358,452 | A | | 9/1944 | Garstang | |
| 2,438,669 | A | | 3/1948 | Krenzke | |
| 3,753,431 | A | * | 8/1973 | Koziol | 126/38 |
| 4,539,900 | A | * | 9/1985 | Reed | 99/353 |
| 5,044,264 | A | * | 9/1991 | Forney | 99/349 |
| 5,131,320 | A | | 7/1992 | Jensen et al. | |
| 6,644,176 | B1 | | 11/2003 | Prip | |
| 2005/0045045 | A1 | * | 3/2005 | Sullivan | 99/388 |
| 2005/0166769 | A1 | * | 8/2005 | Alphandary | 101/31 |
| 2005/0205545 | A1 | * | 9/2005 | Siegel et al. | 219/386 |

OTHER PUBLICATIONS

Web site: http://www.fan-brands.com/brands.html, brands listed on Fan Brands website, obtained Apr. 13, 2004 (3 pages) (enclosed).

* cited by examiner

*Primary Examiner*—Daniel J. Colilla
*Assistant Examiner*—Kevin D. Williams
(74) *Attorney, Agent, or Firm*—Duckor Spradling Metzger & Wynne; Bernard L. Kleinke

(57) ABSTRACT

A product branding apparatus and methods as disclosed relate to a branding element having indicia configured in the shape of a desired design to be branded onto a product and a heating conductor for transferring heat from a heating apparatus to the branding element.

17 Claims, 1 Drawing Sheet

PRODUCT BRANDING APPARATUS AND METHODS FOR MAKING AND USING SAME

FIELD OF THE INVENTION

The present invention relates in general to branding apparatus and methods for making same and for branding a selected portion of a product. The invention, more particularly relates to an apparatus and method for branding with a logo, text, or graphics, a food product being heated on a grill.

BACKGROUND ART

There is no admission that the background art disclosed in this section legally constitutes prior art.

In the past, devices for forming indicia such as text, graphics or combinations of text and graphics on food products have been known.

In U.S. Pat. No. 2,438,669, there is disclosed a device for branding toast.

A cooking utensil is disclosed in U.S. Pat. No. 5,131,320 for frying foodstuffs including a griddle with a contoured image for transfer of such an image to a fried food.

As disclosed in U.S. Pat. No. 2,246,719, a device provides the appearance to a steak or other meat of having been cooked by broiling.

A waffle iron disclosed in U.S. Pat. No. 2,358,452 causes a monogram or initial letters to be formed in a waffle during the preparation thereof.

BRIEF DESCRIPTION OF THE DRAWINGS

The following is a brief description of the drawings.

DETAILED DESCRIPTION OF CERTAIN EMBODIMENTS OF THE INVENTION

Figure 1:
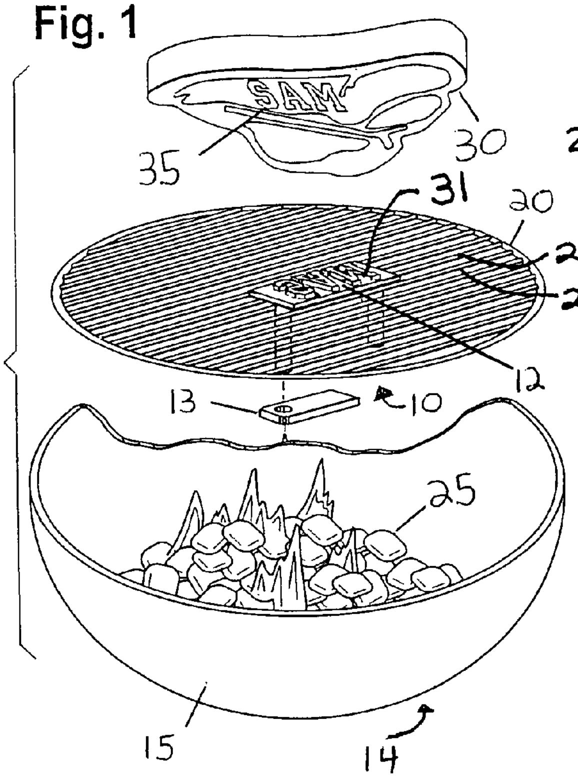
FIG. 1 is an exploded partially broken away pictorial view of a food branding apparatus, which is constructed according to an embodiment of the invention, and which may be used in combination with a grill.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiment of the invention.

A product branding apparatus and methods as disclosed relate to a branding element having indicia configured in the shape of a desired design to be branded onto a product and a heating conductor for transferring heat from a heating apparatus to the branding element.

Referring now to the drawings and more particularly FIG. 1 thereof, there is shown food branding apparatus generally indicated at 10 for branding a product, such as a beef steak 30. While the apparatus 10 disclosed is adapted to be used in conjunction with a food product, other products or objects could also be branded with the instant apparatus and method. The apparatus 10 may be used on a grill such as a grill 14.

Figure 3:
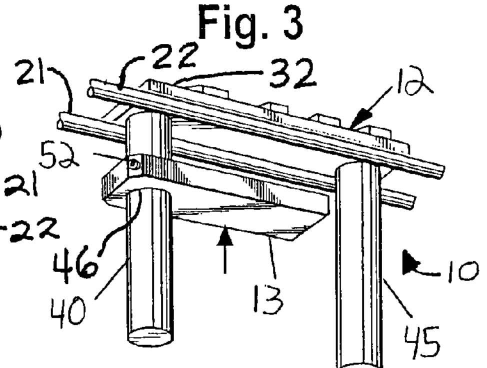
FIG. 3 is an enlarged-scale, fragmentary pictorial view of the apparatus of FIG. 1, showing the apparatus in the process of being clamped to a grate of a grill.
Figure 2:
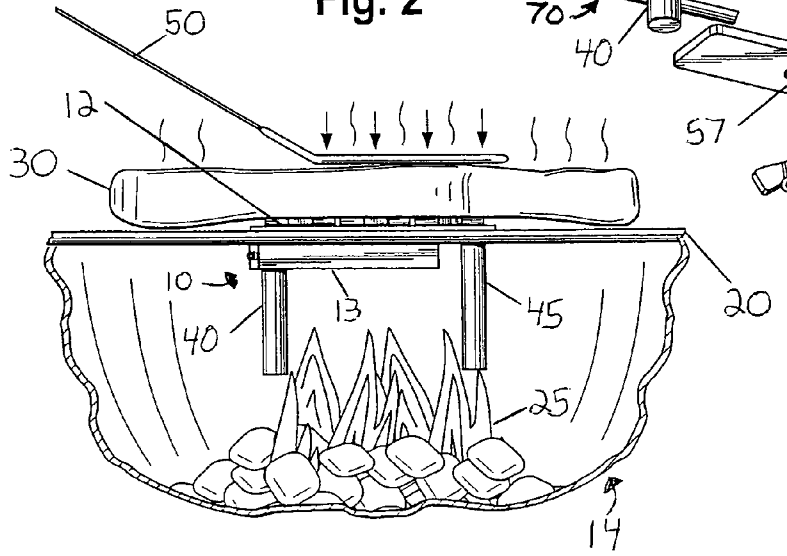
FIG. 2 is an enlarged scale, fragmentary sectional elevational view of the apparatus of FIG. 1, illustrating it assembled to a grill.

With further reference to FIGS. 1, 2 and 3, the apparatus 10 is constructed in accordance with an embodiment of the invention and generally comprises a branding element 12 that may rest on a grilling surface 20 of the grill 14, and one or more heating conductors, such as conductors 40 and 45 (FIGS. 2 and 3) downwardly depending from the branding element 12. The heating conductors 40 and 45 are suitably dimensioned to extend through spaces in the grilling surface 20. A mounting bracket 13 may secure or clamp the branding element 12 to the grill 14 releaseably. Alternatively, the mounting bracket or clamp 13 may not be employed, and the weight of the food product 30 to be branded may be sufficient to press down on the element 12 and prevent or inhibit it from moving during use.

In operation as best shown in FIG. 2, the apparatus 10 is mounted on the cooking surface 20 of the grill 14 using the mounting bracket 13. Downwardly depending heating conductors 40 and 45 extend toward a grill heating apparatus 25, such as burning charcoal. Heat from the heating apparatus 25 is thermally conducted through the heating conductors 40 and 45 to the branding element 12 which is in thermal connectivity to the heating conductors 40 and 45. A product such as the steak 30, or another type of food product or other product, is placed on the cooking surface 20 over the branding element 12. The steak 30 may be branded with a raised indicia 31 (FIG. 1) present on the branding element 12 for engaging the food product 30. The result is a brand 35 formed on the product 30 as best shown in FIG. 1.

FIG. 1 depicts a conventional charcoal grill 14 used in conjunction with the food branding apparatus 10. The grill 14 has a bowl or container 15 for holding the heating apparatus 25 of the grill 14. FIG. 1 shows the heating apparatus being charcoals; however, the branding apparatus 10 may be compatible with other heating systems used on the grill 14 such as gas or electric heating systems (not shown). The grill 14 further includes a cooking surface 20 which may be in the form of a grate. Other grilling surfaces (not shown) may also be utilized as will become apparent to those skilled in the art. Grate 20 may receive a food product such as steak 30 on the upper surface thereof for grilling thereon. Grate 20 may have a plurality of bars, such as bars 21 and 22 and a plurality of corresponding spaces therebetween (FIG. 1).

The invention is not limited to use with the grill 14. Other types and kinds of cooking or heating devices (not shown) may be used with the disclosed embodiment of the present invention including an oven, a stove, a portable grill and others.

Considering now the branding element 12 in more detail with reference to FIG. 1, the branding element 12 has the raised indicia 31 configured in the shape of a desired design to be branded onto the food product 30, and projects from a base 32 as best seen in FIG. 3. The indicia 31 may form any type or kind of indicia that is desired to be marked on the food product. Such indicia may include, but not limited to the logo of a sports team, the trademark of a food service corporation, or any other configuration of text, graphics or combinations thereof for a variety of purposes including, for example, providing brand recognition, safety markings, or any other purpose or intent where marking a product may be desirable. The configuration of the indicia 31 may be informational, purely artistic, or others.

The branding element 12 is preferably formed of metal such as steel, copper, aluminum or others. However, other materials such as a suitable ceramic material or others may also be used. A metal material is a preferable material since it is capable of conducting heat which has the effect of branding many food products that come in contact with the material. Other materials that conduct heat may also be suitable.

In the embodiment shown best in FIG. 1, the indicia 31 configured in the form of a desired design may be formed integrally on the base 32 of the branding element 12 as a raised portion. The raised portion 31 disposed on the branding element 12 may be formed by a number of well known processes including chemical etching, molding and others. Alternatively, the raised indicia 31 may be a separate element, which is fixed by suitable techniques such as solder, welding, bonding and others, to the base 32. In this regard, the raised indicia 31 may be heated to a suitable temperature for branding the product 30. The heated raised indicia 31 may engage the underside of the food product 30 to form the brand 35 thereon.

Considering the heating conductors 40 and 45 in more detail and in reference to FIG. 3, the heating conductors 40 and 45 are similar to one another and thus the conductor 40 will now be described in greater detail. It should be understood that any number of the conductors may be employed. When more than one conductor is employed, the two or more conductors may not be similar to one another. The conductor 40 may be elongated in shape to extend through spaces in the grill, and may be rodlike in shape. The heating conductor 40 depends downwardly from the base 32 of the branding element 12. The heat conductor 40 is preferably formed of metal such as steel, copper, aluminum or others. However, a ceramic material may also be a suitable material. A metal material is a preferable material since it is capable of readily conducting heat. Other materials, such as ceramics, are capable of retaining and conducting heat, may also be used.

The heating conductors 40 and 45, are thermally connected to the branding element 12 through welding or a molding process as is well known in the art. The heat conductors serve to thermally conduct heat from the heating apparatus 25 of the grill 14. By having the heating conductors connected in thermal conductivity with the branding element 12, heat from the heating apparatus 25 is conducted via the heating conductors to the branding element 12. Since branding requires that heat be selectively and directly applied to the food product to form an image thereon, the heat transferred to the branding element 12 from the heat conductors, such as heat conductor 40, enables the branding element 12 to be heated sufficiently to brand products placed in contact with the indicia disposed on the heated branding element 12.

With reference to FIG. 1, the heating conductors, such as heating conductor 40 is sized to fit into the spaces between the bars, such as the bars 21 and 22 of the grate 20 and extend toward the heating apparatus while the conductor 40 disclosed herein is cylindrical in shape and circular in cross section throughout its length, other shapes such as rectangular or oval in cross section throughout the lengths of the cylindrical heating conductor, or other elongated shapes may be employed.

As best shown in FIG. 3, in use, the user places the heating conductors 40 and 45 between openings or spaces between the bars 21 and 22 of the grate 20. The branding element 12 is then disposed in a resting position on the top of the grate 20 and the heating conductors 40 and 45 depend through the grate 20 to a location at or near the heating apparatus 25 of the grill 14.

In the disclosed embodiment as best seen in FIG. 3, a mounting bracket or elongated clamp 13 is provided having a first hole 46 in one side thereof adapted to receive a heating conductor such as the conductor 40. The mounting bracket 13 has a second or cross hole communicating with the first hole 46 for receiving threadably a set screw 52, which is tightened against the heating conductor 40. This functions to fix the mounting bracket 13 adjustably and releaseably to the heating conductor 40.

In operation, after the heating conductors 40 and 45 are slipped through spaces in the grate 20, as described heretofore, the mounting bracket 13 is then slipped onto the heating conductor 40 through its first hole 46 until it engages the underside of the grate 20. In this position, the set screw 52 is then tightened until it contacts the heating conductor 40 which has the effect of locking mounting bracket 13 into a fixed position thereby fixing the branding apparatus 10 in a releaseably fixed position on the grate 20 of the grill 14.

Mounting bracket 13 is releasable by releasing the set screw 52 which permits the mounting bracket to slide downwardly along the heating conductor 40 where it may then be removed. After the mounting bracket 13 is removed from the heating conductor 40, the branding apparatus 10 may then be removed by the user from the grill 14.

Considering now a method of using the branding apparatus 10, the user mounts and clamps the apparatus 10 to the grate of the grill 20 through the use of the mounting bracket 13 as described heretofore. The apparatus 10 may be clamped to the grill 14 where branding activity is to occur, as previously described. Heat from the heating apparatus 25 heats the heating conductors such as heating conductors 40 and 45. The heat from the heating apparatus 25 is then thermally conducted through the heating conductor 40 to the branding element 12. Before or after the branding element 12 has reached a sufficient temperature for forming indicia on a product, a food product such as a steak 30 is placed onto the grilling surface 20 over the branding element 12. A spatula 50 may be optionally used to provide pressure over the food product in the proximate location opposite the branding element 12.

As the product is heated, the heat from the heating apparatus 25 is thermally conducted through the heating conductors 40 and 45 to form indicia onto the product 30 at the locations where the top surface of the indicia on the branding element 12 is in contact with the product 30. The result is a food product having an indicia brand 35 formed on one surface thereon as best seen in FIG. 1.

Figure 4:
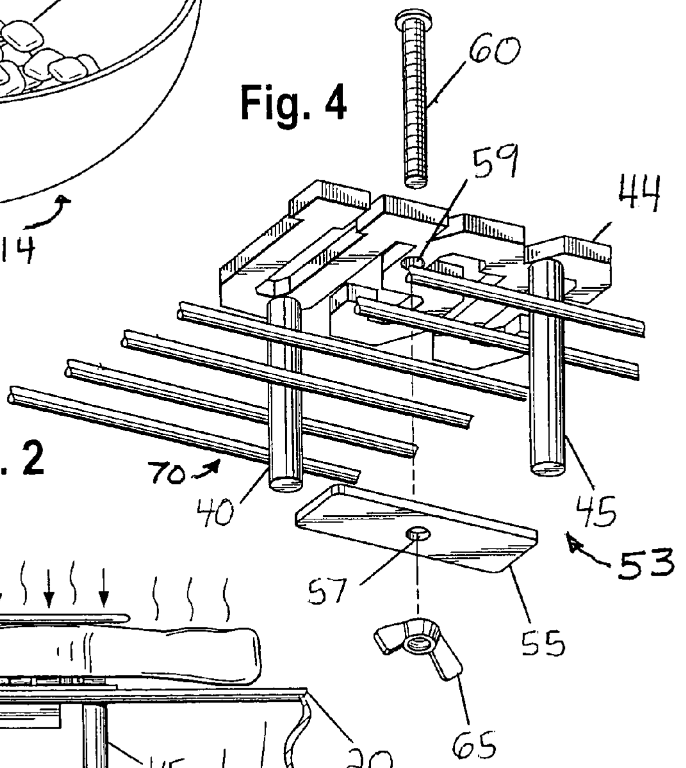
FIG. 4 is a fragmentary pictorial exploded view of another food branding apparatus, which is constructed according to another embodiment of the invention.

Referring now to FIG. 4, a branding apparatus 53 is also constructed according to the invention and is similar to the apparatus 10, except its clamp 55 is connectable to a branding element 44 instead of to its heating conductor. The branding element 44 is a plate and is configured in the shape of a desired design indicia where the entire indicia of the branding element 44 forms the desired brand indicia as opposed to the branding element 12 as shown in FIG. 1 where raised indicia 31 is on the base 32. In use, after the branding element 44 is heated, the top surface of the branding element 44 configured in the desired indicia then comes in contact with a product (not shown) to form a brand thereon.

The user may removably mount the branding apparatus 53 to a grate 70 of a grill (not shown) through the use of a mounting bracket or elongated clamp 55 having a hole 57 at a suitable location such as at its center. In this embodiment the branding element 44 includes a hole 59 formed at a suitable location such as near the geometric center of the branding element 44. It should be noted that the hole 59 may be placed in other positions of the branding element 44. A fastening device such as a mounting bolt 60 is sized to fit through the hole 59 of the branding element 44 and hole 57 of the clamp 55. A wing nut 65 may be provided to be threaded onto the bolt 60 to clamp the branding element 44 onto the top of the grate 70.

To secure the branding apparatus 53 to the grate 70, the mounting bracket 55 is placed underneath the grate 70 and opposite the branding element 44. The hole 57 of mounting bracket 55 is manually positioned in axial alignment with hole 59 of branding element 44. Bolt 60 is then passed through the hole 59 of the branding element 44 and also through the hole 57 of the mounting bracket 55. The wing nut 65 is then attached to the bolt 60 and tightened until sufficient pressure is applied to the mounting bracket 55 which, in turn, provides pressure to fix releaseably the element 44 to the grate 70 to hold the apparatus 53 in a fixed position during branding operations.

To release the apparatus 53 from the grate 70, the wing nut 65 is loosened until it can be removed from the bolt 60. Bolt 60 is then removed from the hole 59 of the branding element 44 and the hole 57 of the mounting bracket 55. The apparatus 53 may then be removed from the grate 70.

While particular embodiments of the present invention have been disclosed, it is to be understood that various different modifications are possible and are contemplated within the true spirit and scope of the appended claims. For example, other products or objects could also be branded with the instant apparatus and method such as furniture or construction materials. There is no intention, therefore, of limitations to the exact abstract or disclosure herein presented.

What is claimed is:

1. A product branding apparatus in combination with a grilling surface for branding products when heated on a grill having a heating apparatus and the grilling surface, the grilling surface having spaces, comprising:

a branding element having indicia configured in the shape of a desired design;

at least one elongated heating conductor connected substantially perpendicular to the plane of the branding element in thermal conductivity thereto, the grilling surface having a plurality of product supporting portions, the spaces being in between the product supporting portions;

the elongated heating conductor sized to fit within the grilling surface spaces for extending substantially perpendicular to the plane of the plurality of product supporting portions; and the elongated heating conductor extending through at least one of the grilling surface spaces and being of a certain length to extend sufficiently toward the heating apparatus of the grill to help conduct heat to the branding element.

2. A product branding apparatus as recited in claim 1, wherein the branding element is composed of metal.

3. A product branding apparatus as recited in claim 2, wherein the branding element is composed of steel.

4. A product branding apparatus as recited in claim 2, wherein the branding element is composed of aluminum.

5. A product branding apparatus as recited in claim 1, wherein the branding element is composed of a ceramic material.

6. A product branding apparatus as recited in claim 1, wherein the heating conductor is composed of metal.

7. A product branding apparatus as recited in claim 2, wherein the heating conductor is comprised of steel.

8. A product branding apparatus as recited in claim 2, wherein the heating conductor is comprised of aluminum.

9. A product branding apparatus as recited in claim 1, wherein the heating conductor is comprised of a ceramic material.

10. A product branding apparatus as recited in claim 1, further including a mounting bracket for securing releaseably the branding element to the grill.

11. A product branding apparatus for branding products when heated on a grill having heating apparatus and grilling surface, the grilling surface having spaces, comprising:

a branding element having indicia configured in the shape of a desired design;

at least one heating conductor connected to the branding element in thermal conductivity thereto;

the heating conductor sized to fit within the grilling surface spaces; and the heating conductor being of sufficient length to be disposed proximate to the heating apparatus of the grill when the heating conductor is disposed within the grilling surface spaces of the grill; and a mounting bracket for securing releaseably the branding element to the grill;

wherein the mounting bracket further includes a metal bracket having a hole formed therein;

the branding element having a hole formed therein and disposed in axial alignment with the hole formed in the metal bracket, a fastening device; and the holes in the branding element and the bracket being sized to pass the fastening device therethrough.

12. A product branding apparatus for branding products when heated on a grill having a heating apparatus and grilling surface, the grilling surface having spaces, comprising:

a branding element having indicia configured in the shape of a desired design;

at least one heating conductor connected to the branding element in thermal conductivity thereto;

the heating conductor sized to fit within the grilling surface spaces; and the heating conductor being of sufficient length to be disposed proximate to the heating apparatus of the grill when the heating conductor is disposed within the grilling surface spaces of the grill; and a mounting bracket for securing releaseably the branding element to the grill;

wherein the mounting bracket further includes a first hole formed therein for allowing the elongated metal rod to pass therethrough;

a second hole therein and in communicating relationship to the first hole; and a set screw disposed in the second hole wherein the set screw passes through the first hole and into the second hole when tightened and thereby engaging the outer surface of the heating conductor when tightened.

13. A product branding apparatus as recited in claim 1, wherein the conductor is rodlike in shape.

14. A product branding apparatus as recited in claim 13, wherein the conductor is cylindrical in shape.

15. A method of making branding apparatus for branding an indicia on a product when heated on a grill having a heating apparatus and grilling surface, the grilling surface having spaces therein, the grilling surface having a plurality of product supporting portions, the spaces being in between the product supporting portions, comprising:

providing a branding element having indicia configured in the shape of a desired design on the branding element;

providing an elongated heating conductor depending substantially perpendicular from the plane of the branding element, the elongated heating conductor sized to fit within the grilling surface spaces for extending substantially perpendicular to the plane of the plurality of product support portions, the elongated heating conductor extending through at least one of the grilling surface spaces and of a certain length to extend sufficiently toward the heating apparatus to help conduct heat to the branding element; and connecting the elongated heating conductor in thermal conductivity with the branding element so that the elongated heating conductor and the branding element are thermally connected.

16. A method according to claim 15, further including providing a clamp, and releaseably connecting the clamp to the branding element.

17. A method of using a branding apparatus having a branding element having indicia configured in the shape of a desired design and at least one depending elongated heating conductor for branding the indicia on a product when heated on a grill, the grill having a grilling surface, the grilling surface having spaces therein, the grilling surface having a plurality of product supporting portions, the spaces being in between the product supporting portions, comprising:

disposing the branding element in engagement with the grilling surface;

extending the elongated heating conductor substantially perpendicular to the plane of the branding element and substantially perpendicular to the plane of the plurality of product supporting portions through at least one of the grilling surface spaces, the heating conductor being of a certain length to extend sufficiently toward the heating apparatus of the grill to help conduct heat to the branding element;

securing releaseably the branding element to the grilling surface;

heating the elongated heating conductor; and disposing a product onto the grilling surface over the branding element.

* * * * *